United States Patent
Stahlman et al.

(10) Patent No.: US 10,920,624 B2
(45) Date of Patent: Feb. 16, 2021

(54) ENERGY-RECOVERY TURBINES FOR GAS STREAMS

(71) Applicant: UOP LLC, Des Plaines, IL (US)

(72) Inventors: Jason Lee Stahlman, Arlington Heights, IL (US); Donald A. Eizenga, Elk Grove Village, IL (US); William M. Hartman, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 57 days.

(21) Appl. No.: 16/020,562

(22) Filed: Jun. 27, 2018

(65) Prior Publication Data

US 2020/0003082 A1   Jan. 2, 2020

(51) Int. Cl.
| | |
|---|---|
| *F01K 27/02* | (2006.01) |
| *B01D 3/00* | (2006.01) |
| *B01D 3/32* | (2006.01) |
| *B01D 3/42* | (2006.01) |
| *F01K 13/02* | (2006.01) |
| *F25J 1/02* | (2006.01) |
| *F01K 7/42* | (2006.01) |
| *F25J 3/02* | (2006.01) |

(52) U.S. Cl.
CPC .............. *F01K 27/02* (2013.01); *B01D 3/007* (2013.01); *B01D 3/32* (2013.01); *B01D 3/42* (2013.01); *F01K 7/42* (2013.01); *F01K 13/02* (2013.01); *F25J 1/0242* (2013.01); *F25J 3/0228* (2013.01); *F25J 2240/82* (2013.01)

(58) Field of Classification Search
CPC . F22G 5/12; F22G 5/123; F22G 5/126; F22G 5/16; F01K 7/42; F01K 13/02; F01K 27/02; F22B 1/1838; C10G 11/18; C10G 11/182; C10G 11/185; C10G 11/187; B01D 3/007; B01D 3/32; B01D 3/322; B01D 3/42; F25J 1/0242; F25J 3/0228; F25J 2240/82
See application file for complete search history.

(56) References Cited

U.S. PATENT DOCUMENTS

| | | | |
|---|---|---|---|
| 2,293,314 A * | 8/1942 | Spence | ..................... F22G 5/12 261/18.1 |
| 4,285,481 A | 8/1981 | Biscomb | |
| 4,428,203 A | 1/1984 | Carson | |
| 4,455,614 A | 6/1984 | Martz et al. | |

(Continued)

FOREIGN PATENT DOCUMENTS

| | | |
|---|---|---|
| CN | 102203780 A | 9/2011 |
| CN | 103917280 A | 7/2014 |

(Continued)

OTHER PUBLICATIONS

Frey, Stanley Joseph, et al., U.S. Appl. No. 15/923,990, filed Mar. 16, 2018 and entitled "Turbine with Supersonic Separation".

(Continued)

*Primary Examiner* — Mark A Laurenzi
*Assistant Examiner* — Xiaoting Hu (57) ABSTRACT

Processes for recovering electrical power from a process unit waste heat steam generation system are described. A power-recovery turbine reduces the pressure of a stream of superheated steam to a pressure lower than that needed by the steam reboiler for use in other process units or equipment in the plant.

18 Claims, 3 Drawing Sheets

(56) References Cited

U.S. PATENT DOCUMENTS

| | | | |
|---|---|---|---|
| 5,384,489 A | | 1/1995 | Bellac |
| 6,261,055 B1 | | 7/2001 | Owczarek |
| 6,265,453 B1 | | 7/2001 | Kennedy |
| 6,681,155 B1 | | 1/2004 | Fujita et al. |
| 6,898,540 B2 | | 5/2005 | Davies |
| 6,962,199 B1 | | 11/2005 | Tjeenk Willink et al. |
| 7,261,766 B2 | | 8/2007 | Betting et al. |
| 7,318,849 B2 | | 1/2008 | Betting et al. |
| 7,487,955 B1 | * | 2/2009 | Buercklin ................ F22G 5/12 251/122 |
| 7,494,535 B2 | | 2/2009 | Betting et al. |
| 7,757,493 B2 | * | 7/2010 | Bell ........................ F01K 23/16 60/39.182 |
| 7,909,312 B2 | | 3/2011 | Tjeenk Willink et al. |
| 7,948,101 B2 | | 5/2011 | Burtch |
| 8,257,458 B2 | | 9/2012 | Betting et al. |
| 8,398,734 B2 | | 3/2013 | Tjeenk Willink et al. |
| 8,404,918 B2 | | 3/2013 | Frey |
| 8,475,555 B2 | | 7/2013 | Betting et al. |
| 8,510,015 B2 | | 8/2013 | Beausoleil et al. |
| 8,657,930 B2 | | 2/2014 | Betting et al. |
| 8,763,625 B1 | | 7/2014 | Carter |
| 8,967,590 B2 | | 3/2015 | Minervini et al. |
| 9,034,082 B2 | | 5/2015 | Betting et al. |
| 9,085,499 B2 | | 7/2015 | Frey et al. |
| 9,235,228 B2 | | 1/2016 | Gazit et al. |
| 9,764,272 B2 | | 9/2017 | Martin et al. |
| 2005/0034463 A1 | | 2/2005 | Simpson et al. |
| 2007/0253885 A1 | * | 11/2007 | Yang .................. C01B 21/1481 423/365 |
| 2008/0015839 A1 | | 1/2008 | Noureldin et al. |
| 2008/0110801 A1 | * | 5/2008 | Yuan ...................... C10G 35/02 208/63 |
| 2009/0125152 A1 | | 5/2009 | Skowronski et al. |
| 2011/0077448 A1 | | 3/2011 | Frey |
| 2011/0100004 A1 | | 5/2011 | Al-Mazeedi |
| 2011/0305602 A1 | * | 12/2011 | Nicholas ................ C10G 11/18 422/142 |
| 2012/0107227 A1 | | 5/2012 | Fischer et al. |
| 2012/0118526 A1 | | 5/2012 | Sudau et al. |
| 2012/0210874 A1 | * | 8/2012 | Iijima ................ B01D 53/1425 95/168 |
| 2012/0227440 A1 | | 9/2012 | Guidati et al. |
| 2012/0245754 A1 | | 9/2012 | Mehnert |
| 2012/0260667 A1 | | 10/2012 | Chillar et al. |
| 2012/0326443 A1 | * | 12/2012 | Vince ...................... F01D 15/10 290/7 |
| 2013/0199185 A1 | | 8/2013 | Wain et al. |
| 2014/0331672 A1 | | 11/2014 | Filippi et al. |
| 2015/0118131 A1 | | 4/2015 | Martin et al. |
| 2016/0079756 A1 | | 3/2016 | Ikeyama et al. |
| 2016/0141878 A1 | | 5/2016 | Johansen |
| 2016/0161536 A1 | | 6/2016 | Amminudin |
| 2016/0252015 A1 | | 9/2016 | Kusumi et al. |
| 2016/0319198 A1 | | 11/2016 | Quanci et al. |
| 2017/0058206 A1 | | 3/2017 | Noureldin et al. |
| 2017/0058207 A1 | | 3/2017 | Noureldin et al. |

FOREIGN PATENT DOCUMENTS

| | | |
|---|---|---|
| CN | 104463341 A | 3/2015 |
| CN | 206538206 | 10/2017 |
| EP | 0552039 | 7/1993 |
| EP | 2778354 A1 | 9/2014 |
| FR | 2414162 | 8/1979 |
| GB | 1003517 | 9/1965 |
| RU | 2014114067 | 10/2015 |
| WO | 2014119569 A1 | 8/2014 |
| WO | 2014178079 A2 | 11/2014 |
| WO | 2015128049 A1 | 9/2015 |
| WO | 2016177376 A1 | 11/2016 |

OTHER PUBLICATIONS

Frey, Stanley J., et al., U.S. Appl. No. 62/644,086, filed Mar. 16, 2018 and entitled "System for Consolidation and Use of Power Recovered from a Turbine in a Process Unit".

Frey, Stanley J., et al., U.S. Appl. No. 62/644,104, filed Mar. 16, 2018 and entitled "System for Power Recovery from Quench and Dilution Vapor Streams".

Frey, Stanley Joseph, et al., U.S. Appl. No. 15/924,037, filed Mar. 16, 2018 and entitled "Power Recovery from Quench and Dilution Vapor Streams".

Frey, Stanley J., U.S. Appl. No. 15/923,936, filed Mar. 16, 2018 and entitled "Energy-Recovery Turbines for Gas Streams".

Frey, Stanley J., et al., U.S. Appl. No. 15/923,945, filed Mar. 16, 2018 and entitled "Consolidation and Use of Power Recovered from a Turbine in a Process Unit".

Frey, Stanley J., et al., U.S. Appl. No. 15/923,964, filed Mar. 16, 2018 and entitled "Process Improvement through the Addition of Power Recovery Turbine Equipment in Existing Processes".

Harris, James W., et al., U.S. Appl. No. 15/924,034, filed Mar. 16, 2018 and entitled "Use of Recovered Power in a Process".

Frey, Stanley Joseph, et al., U.S. Appl. No. 15/923,978, filed Mar. 16, 2018 and entitled "Hydroprocessing Unit with Power Recovery Turbines".

Harris, James W., et al., U.S. Appl. No. 15/923,995, filed Mar. 16, 2018 and entitled "Steam Reboiler with Turbine".

Frey, Stanley Joseph, et al., U.S. Appl. No. 15/923,997, filed Mar. 16, 2018 and entitled "Process for Adjusting at Least One Processing Condition of a Chemical Processing Unit with a Turbine".

Hawkins, LA, et al., Development of 125kw AMB Expander/Generator for Waste Heat Recovery, J. of Engineering for Gas Turbines and Power, Jul. 2011, 133, p. 07250301 to 6.

Tsourapas, Vasilios, Control Analysis of Integrated Fuel Cell Systems with Energy Recuperation Devices, 2007.

The Elliot Group, Maximize the Efficiency of your Steam Process, 2014.

U.S. Department of Energy, Replace Pressure-Reducing Valves with Backpressure Turbogenerators.

Mechanical Solutions, Inc., Replacing a Pressure Reducing Valve with a Hydro Turbine for a Municipal Water Supply, Jul. 19, 2016.

International Search Report from PCT application No. PCT/US2019/039291, dated Oct. 3, 2019.

Written Opinion from PCT application No. PCT/US2019/037595, dated Sep. 18, 2019.

\* cited by examiner

ENERGY-RECOVERY TURBINES FOR GAS STREAMS

In a reforming process, there are generally at least two reformers with a heater before each reactor. Because the reforming reaction is endothermic, the charge heater and/or interheater is used to raise the temperature of the effluent from the first reformer to that needed at the inlet of the second (or subsequent) reformer. The charge heaters and/or interheaters generate flue gas in the combustion section which then goes to a common convection section. The effluent from the last reformer is separated into various fractions in a separation section containing one of more distillation columns.

One way to recover at least some of the waste heat from the flue gas is by using it to produce high pressure steam for use in the reforming process or elsewhere in the plant. In this case, the vapor from a steam drum is heated using the flue gas from the convection section of the heaters.

The distillation columns used to fractionate the effluent from the reformer typically include steam reboilers. The steam reboilers may require steam at higher pressure than is available in the refinery. The high pressure steam needed for the steam reboiler is often higher than that needed for other equipment and processes. As a result, the steam generator is designed for the higher operating pressure needed by the steam reboilers, and the pressure of the remaining steam is reduced by passing the steam through a control valve so that it can be used at the lower pressures needed by other equipment and processes. While the pressure is thereby reduced, a significant amount of energy is wasted.

Therefore, there is a need for an improved process for utilizing high pressure steam streams with minimal energy loss.

SUMMARY AND DETAILED DESCRIPTION

The present process is designed to improve the energy efficiency, and consequently the cost efficiency, of processes using steam reboilers. Because the pressure needed for the steam reboiler exceeds that needed for other processes and equipment, the pressure must be reduced in order to use the steam in other places. Rather than passing the steam though a control valve as is done currently, the steam is sent through a power-recovery turbine to recover the energy otherwise lost in the control valve. The energy efficiency for the overall process is increased due to the power recovery.

The power-recovery turbine reduces the high pressure steam from the pressure needed for the steam reboiler to a lower pressure. The lower pressure could be any pressure lower than that need for the steam reboilers, and it will depend on the steam requirements of the plant. Alternatively, one or more additional power-recovery turbines could be included which would allow the steam pressure to be reduced to two or more pressures lower than the pressure of the steam reboilers. Multiple pressures could also be achieved using a single power-recovery turbine with intermediate extraction draws. In this arrangement, there would be several wheels on the same shaft with takeoffs between the wheels.

Furthermore, in some cases, the initial steam pressure can be raised above what is needed for the steam reboilers in order to increase the power recovery. In some cases, this would allow for the use of more efficient power-recovery turbines.

The temperature can be reduced using any suitable method of steam temperature control. Suitable methods include but are not limited to direct contact temperature control, such as with a desuperheater, or indirect heat exchange.

The use of one or more desuperheaters is desirable because it can independently control temperature when the flue gas is controlled by the process unit rather than by the steam system. It reduces the temperature and at the same time produces more steam at the desired temperature by direct contact heating of the supplied water.

The steam stream for the power-recovery turbine can be taken off either upstream of one or more desuperheaters for reducing the temperature of the steam or downstream from it. If it is taken downstream, the amount of desuperheating would be limited to the amount needed to protect the power-recovery turbine while maximizing power generation. If it is taken upstream, the power-recovery turbine might need to be made from high temperature materials and/or the convection section steam generator might need to be specially designed.

One aspect of the invention is a process for recovering electrical power from a process unit waste heat steam generation system. In one embodiment, the process comprises: providing a stream of superheated steam having a first temperature and a first pressure; dividing the stream of superheated steam into a first portion and a second portion; heating a bottom stream from a column in a steam reboiler with the first portion; introducing the heated bottom stream to the column; and directing the second portion of the superheated steam through a power-recovery turbine to reduce a pressure of the second portion to a second pressure less than the first pressure forming a depressurized stream.

In some embodiments, the depressurized stream is directed to a steam header.

In some embodiments, the depressurized stream is directed to at least one of a pump, a compressor, a reboiler, a column, such as a stripping column or a fractionation column, or a process unit.

In some embodiments, the steam reboiler comprises a heat exchanger having a steam inlet and a condensate outlet, and further comprising: directing the condensate to a condensate return header.

In some embodiments, the temperature of the first portion of the superheated steam is reduced to a second temperature less than the first temperature to form a desuperheated stream before heating the bottom stream.

In some embodiments, the temperature of the first portion is reduced by introducing the first portion into at least one desuperheater to reduce a temperature of the first portion to a second temperature less than the first temperature to form a desuperheated stream In some embodiments, there are at least two desuperheaters, and wherein a temperature of the desuperheated stream exiting the second desuperheater is less a temperature of the desuperheated stream exiting the first desuperheater.

In some embodiments, a stream of desuperheating water is introduced into the at least one desuperheater to reduce the temperature of the first portion.

In some embodiments, the first pressure of the stream of superheated steam is increased before introducing the first portion into the at least one desuperheater and before directing the second portion through the power-recovery turbine.

In some embodiments, the stream of superheated steam is divided into the first portion and the second portion before introducing the first portion into the at least one desuperheater. In other embodiments, the stream of superheated steam is divided into the first portion and the second portion steam after introducing the first portion into the at least one desuperheater.

In some embodiments, the depressurized stream is divided into a first part and a second part, and the second part of the depressurized stream is directed through a second power-recovery turbine to reduce a pressure of the second part to a third pressure less than the second pressure.

In some embodiments, a part of the desuperheated stream is selectively directed through a pressure control valve.

In some embodiments, the process comprises at least one of: sensing at least one parameter of the process and generating a signal or data from the sensing; or generating and transmitting a signal; or generating and transmitting data.

In another aspect, the process comprises reforming a naphtha-containing stream in at least one catalytic reforming zone comprising at least one reformer to form a reformate stream; separating the reformate stream into at least two fractions in a distillation column; heating water or steam using heat from a convection zone of at least one heater to provide a stream of superheated steam having a first temperature and a first pressure; dividing the stream of superheated steam into a first portion and a second portion; introducing the first portion of the superheated steam to at least one desuperheater to reduce a temperature of the first portion to a second temperature less than the first temperature to form a desuperheated stream; heating a bottom stream from the distillation column in a steam reboiler with the desuperheated stream; introducing the heated bottom stream to the distillation column; and directing the second portion of the superheated steam through a power-recovery turbine to reduce a pressure of the second portion to a second pressure less than the first pressure forming a depressurized stream.

In some embodiments, the steam reboiler comprises a heat exchanger having a steam inlet and a condensate outlet, and wherein a condensate at the condensate outlet has a temperature less than the second temperature, and further comprising: directing the condensate to a condensate return header.

In some embodiments, there are at least two desuperheaters, and wherein a temperature of the desuperheated stream exiting the second desuperheater is less a temperature of the desuperheated stream exiting the first desuperheater.

In some embodiments, the first pressure of the stream of superheated steam is increased before introducing the first portion into the at least one desuperheater and before directing the second portion through the power-recovery turbine.

In some embodiments, the stream of superheated steam is divided into the first portion and the second portion before introducing the first portion into the at least one desuperheater.

In some embodiments, the depressurized stream is divided into a first part and a second part; the second part of the depressurized stream is directed through a second power-recovery turbine to reduce a pressure of the second part to a third pressure less than the second pressure.

Although the process for recovering electrical power from a steam reboiler is described below in connection with a reforming process, it should be noted that it is not intended to be so limited. It can be used in any situation in which steam is generated at a higher pressure than is needed for all the equipment and/or processes.

Generally, the catalytic reforming zone has at least two reformers where the reactant stream flows serially through the reformers. Reaction systems having multiple reformers generally take one of two forms: a side-by-side form or a stacked form. In the side-by-side form, multiple and separate reaction vessels, each that can include a reformer, may be placed alongside each other. In the stacked form, one common reaction vessel can contain multiple and separate reformers that may be placed on top of each other. In both reaction systems, there can be intermediate heating or cooling between the reformers, depending on whether the reactions can be endothermic or exothermic.

The reforming zones can include any number of arrangements for hydrocarbon flow such as downflow, upflow, crossflow, and radial flow.

A reforming process can employ a fixed catalyst bed, or a moving bed reaction vessel and a moving bed regeneration vessel.

In moving catalyst beds, the catalyst particles may be movable through the reaction zone by any number of motive devices, including conveyors or transport fluid, but most commonly the catalyst particles are movable through the reaction zone by gravity. Typically, in a radial flow reaction zone, the catalyst particles can fill the annular space between the inner and outer screens, which may be called the catalyst bed. Catalyst particles can be withdrawn from a bottom portion of a reaction zone, and catalyst particles may be introduced into a top portion of the reaction zone. The catalyst particles withdrawn from the final reaction zone can subsequently be recovered from the process, regenerated in a regeneration zone of the process, or transferred to another reaction zone. Likewise, the catalyst particles added to a reaction zone can be catalyst that is being newly added to the process, catalyst that has been regenerated in a regeneration zone within the process, or catalyst that is transferred from another reaction zone.

Typically, the rate of catalyst movement through the catalyst beds may range from as little as about 45.5 kg (about 100 pounds) per hour to about 2,722 kg (about 6,000 pounds) per hour, or more.

The usual feedstock for catalytic reforming is a petroleum fraction known as naphtha and having an initial boiling point of about 82° C. (about 180° F.), and an end boiling point of about 203° C. (about 400° F.). The catalytic reforming process is particularly applicable to the treatment of straight run naphthas comprised of relatively large concentrations of naphthenic and substantially straight chain paraffinic hydrocarbons, which are subject to aromatization through dehydrogenation and/or cyclization reactions. The preferred charge stocks are naphthas consisting principally of naphthenes and paraffins that can boil within the gasoline range, although, in many cases, aromatics also can be present. This preferred class includes straight-run gasolines, natural gasolines, synthetic gasolines, and the like. As an alternative embodiment, it is frequently advantageous to charge thermally or catalytically cracked gasolines or partially reformed naphthas. Mixtures of straight-run and cracked gasoline-range naphthas can also be used to advantage. The gasoline-range naphtha charge stock may be a full-boiling gasoline having an initial boiling point of about 40 to about 82° C. (about 104 to about 180° F.) and an end boiling point within the range of about 160 to about 220° C. (about 320 to about 428° F.), or may be a selected fraction thereof which generally can be a higher-boiling fraction commonly referred to as a heavy naphtha, for example, a naphtha boiling in the range of about 100 to about 200° C. (about 212 to about 392° F.). In some cases, it is also advantageous to charge pure hydrocarbons or mixtures of hydrocarbons that have been recovered from extraction units, for example, raffinates from aromatics extraction or straight-chain paraffins, which are to be converted to aromatics. In some other cases, the feedstock may also contain light hydrocarbons that have 1-5 carbon atoms, but since these light hydrocarbons cannot be readily reformed into aromatic hydrocarbons, these light hydrocarbons entering with the feedstock are generally minimized.

Usually, in catalytic reforming, a feedstock is admixed with a recycle stream comprising hydrogen to form what is commonly referred to as a combined feed stream, and the combined feed stream is contacted with a catalyst in a reaction zone.

In a common form, the reforming process can employ the catalyst particles in several reaction zones interconnected in a series flow arrangement. There may be any number of reaction zones, but usually the number of reaction zones is 3, 4 or 5. Because reforming reactions occur generally at an elevated temperature and are generally endothermic, each reaction zone usually has associated with it one or more heating zones, which heat the reactants to the desired reaction temperature.

The catalyst particles are typically comprised of one or more Group VIII (IUPAC 8-10) noble metals (e.g., platinum, iridium, rhodium, and palladium) and a halogen combined with a porous carrier, such as a refractory inorganic oxide. U.S. Pat. No. 2,479,110, for example, teaches an alumina-platinum-halogen reforming catalyst. Although the catalyst may contain about 0.05 to about 2.0 wt-% of Group VIII metal, a less expensive catalyst, such as a catalyst containing about 0.05 to about 0.5 wt-% of Group VIII metal may be used. In addition, the catalyst may contain indium and/or a lanthanide series metal such as cerium. The catalyst particles may also contain one or more Group IVA (IUPAC 14) metals (e.g., tin, germanium, and lead), such as described in U.S. Pat. Nos. 4,929,333, 5,128,300, and the references cited therein. The halogen is typically chlorine, and alumina is commonly the carrier. Suitable alumina materials include, but are not limited to, gamma, eta, and theta alumina. One property related to the performance of the catalyst is the surface area of the carrier. Preferably, the carrier has a surface area of about 100 to about 500 m$^2$/g. The activity of catalysts having a surface area of less than about 130 m$^2$/g tend to be more detrimentally affected by catalyst coke than catalysts having a higher surface area. Generally, the particles are usually spheroidal and have a diameter of about 1.6 to about 3.1 mm (about 1/16 to about 1/8 inch), although they may be as large as about 6.35 mm (about 1/4 inch) or as small as about 1.06 mm (about 1/24 inch). In a particular reforming reaction zone, however, it is desirable to use catalyst particles which fall in a relatively narrow size range.

Typical feed inlet temperature for the reformers are between 440 and 580° C. (824 and 1076° F.), or between 500 and 580° C. (932 and 1076° F.), or between 540 and 580° C. (1004 and 1076° F.), or at least above 540° C. (932° F.). The reformers may have different operating temperatures, for example, with a first reforming reactor having a temperature between 500 to 540° C. (932 to 1004° F.) and a second, subsequent reforming reactor having a temperature greater than 540° C. (1004° F.). The reformers can be operated at a range of pressures generally from atmospheric pressure of about 0 to about 6,895 kPa(g) (about 0 psi(g) to about 1,000 psi(g)), or about 276 to about 1,379 kPa(g) (about 40 to about 200 psi(g)). The reaction conditions also include a liquid hour space velocity (LHSV) in the range from 0.6 hr$^{-1}$ to 10 hr$^{-1}$. Preferably, the LHSV is between 0.6 hr$^{-1}$ and 5 hr$^{-1}$, with a more preferred value between 1 hr$^{-1}$ and 5 hr$^{-1}$, and with a most preferred value between 2 hr$^{-1}$ and 5 hr$^{-1}$. The shorter residence time is especially preferred when utilizing the higher temperatures. The catalyst also has a residence time in the reformers of between 0.5 hours and 36 hours.

In exemplary flow through the train of heating and reaction zones is a 4-reaction zone catalytic reforming process, having first, second, third and fourth reformers, which can be described as follows.

Figure 1:
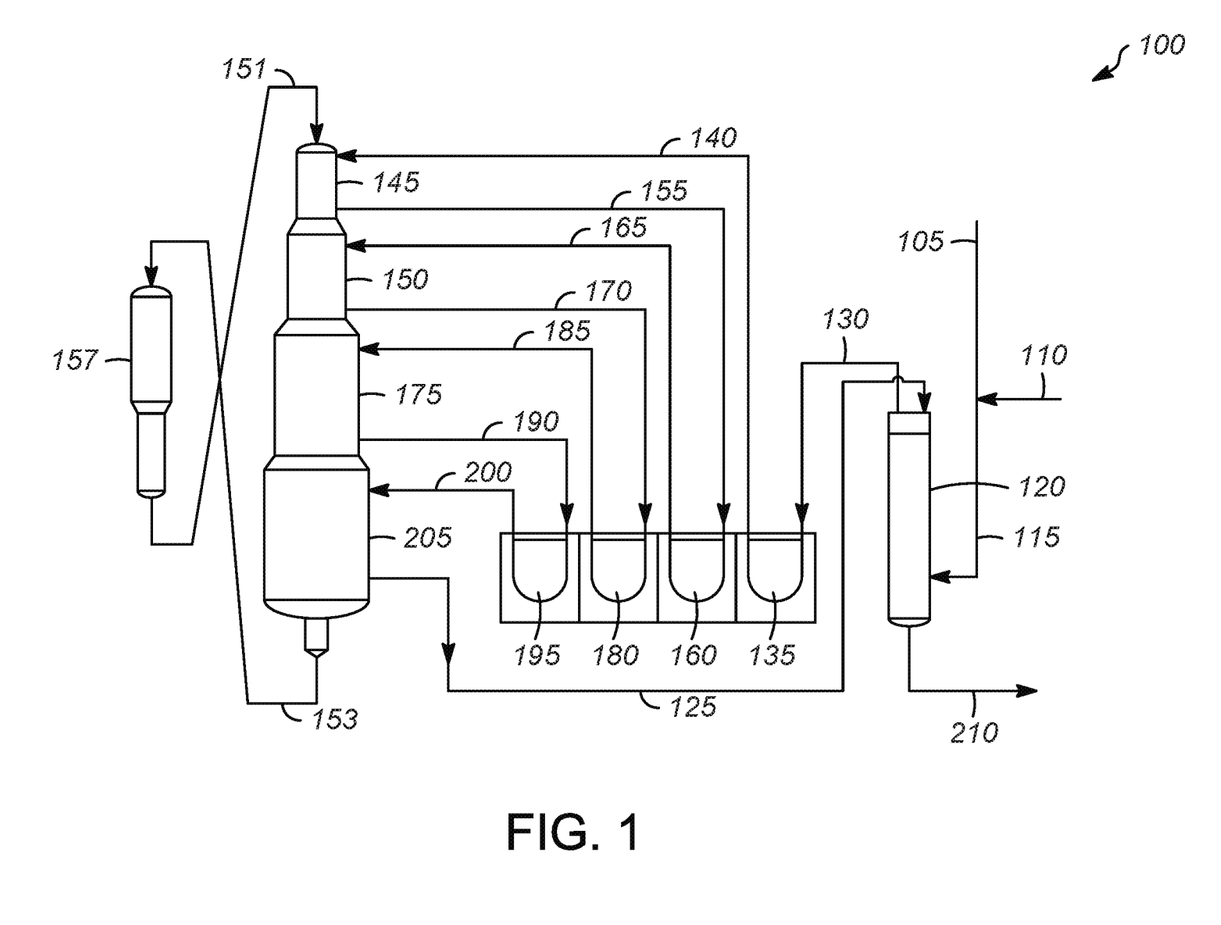
FIG. 1 is an illustration of a typical reforming process.

FIG. 1 illustrates one embodiment of a reforming process 100. A naphtha-containing hydrocarbon feedstock 105 can admix with a hydrogen-containing recycle gas 110 to form a combined feed stream 115, which may pass through a combined feed heat exchanger 120. In the combined feed heat exchanger 120, the combined feed stream 115 can be heated by exchanging heat with the effluent stream 125 of the fourth reformer. However, the heating of the combined feed stream 115 that occurs in the combined feed heat exchanger 120 is generally insufficient to heat the combined feed stream to the desired inlet temperature of the first reformer.

Generally, hydrogen is supplied to provide an amount of about 1 to about 20 moles of hydrogen per mole of hydrocarbon feedstock entering the reforming zones. Hydrogen may be supplied to provide an amount of less than about 3.5 moles of hydrogen per mole of hydrocarbon feedstock entering the reforming zones. If hydrogen is supplied, it may be supplied upstream of the combined feed heat exchanger 120, downstream of the combined feed heat exchanger 120, or both upstream and downstream of the combined feed heat exchanger 120. Alternatively, no hydrogen may be supplied before entering the reforming zones with the hydrocarbon feedstock. Even if hydrogen is not provided with the hydrocarbon feedstock 105 to the first reformer, the naphthene reforming reactions that occur within the first reformer can yield hydrogen as a by-product. This by-product, or in-situ-produced, hydrogen leaves the first reformer in an admixture with the first reformer effluent and then can become available as hydrogen to the second reformer and other downstream reformers. This in situ hydrogen in the first reformer effluent usually amounts to about 0.5 to about 2 moles of hydrogen per mole of hydrocarbon feedstock.

Usually, the combined feed stream 115 (or the hydrocarbon feedstock 105 if no hydrogen is provided with the hydrocarbon feedstock) enters the combined feed heat exchanger 120 at a temperature of generally about 38° C. to about 177° C. (about 100° F. to about 350° F.), and more usually about 93° C. to about 121° C. (about 200° F. to about 250° F.). Because hydrogen is usually provided with the hydrocarbon feedstock, this heat exchanger may be referred to herein as the combined feed heat exchanger 120, even if no hydrogen is supplied with the hydrocarbon feedstock. Generally, the combined feed heat exchanger 120 heats the combined feed stream 115 by transferring heat from the effluent stream 125 of the last reforming reaction zone to the combined feed stream 115. Preferably, the combined feed heat exchanger 120 is an indirect, rather than a direct, heat exchanger, in order to prevent valuable reformate product in the last reaction zone's effluent stream 125 from intermixing with the combined feed stream 115 where the reformate quality could be degraded.

Although the flow pattern of the combined feed stream 115 and the last reaction zone effluent stream 125 within the combined feed heat exchanger 120 could be completely co-current, reversed, mixed, or cross flow, the flow pattern is preferably countercurrent. Any suitable type of heat exchangers can be used, including shell-and-tube type heat exchangers and plate type heat exchangers.

In one embodiment, the combined feed stream 130 can leave the combined feed heat exchanger 120 at a temperature of about 399° C. to about 516° C. (about 750° F. to about 960° F.).

After exiting the combined feed heat exchanger 120 and prior to entering the first reformer, the combined feed stream 130 often requires additional heating. This additional heating can occur in a charge heater 135, which is commonly referred to as a charge heater, which can heat the combined feed stream 130 to the desired inlet temperature of the first reformer 145. Such a heater can be a gas-fired, an oil-fired, or a mixed gas-and-oil-fired heater, of a kind that is well known to persons of ordinary skill in the art of reforming. The charge heater 135 may heat the combined feed stream 130 by radiant and/or convective heat transfer. Commercial fired heaters for reforming processes typically have individual radiant heat transfer sections for individual heaters, and an optional common convective heat transfer section that is heated by the flue gases from the radiant sections.

The temperature of the combined feed stream 140 leaving the charge heater 135, which may also be the inlet temperature of the first reformer 145.

Once the combined feed stream 140 passes to the first reformer 145, the combined feed stream 140 may undergo conversion reactions.

Because of the endothermic reforming reactions that occur in the first reformer 145, generally the temperature of the effluent 155 of the first reformer 145 falls not only to less than the temperature of the combined feed stream 140 to the first reformer 145, but also to less than the desired inlet temperature of the second reformer 150. Therefore, the effluent 155 of the first reformer 145 can pass through another heater 160, which is commonly referred to as the first interheater 160, and which can heat the first reformer effluent 155 to the desired inlet temperature of the second reformer 150.

Generally, a heater 160 is referred to as an interheater when it is located between two reformers, such as the first and second reformers 145, 150. The first reformer effluent 155 is sent to the interheater 160 and heated to the inlet temperature of the second reformer 150 (with allowance for heat loss during transfer).

On exiting the first interheater 160, generally the heated effluent 165 enters the second reformer 150. As in the first reformer 145, the endothermic reactions can cause another decline in temperature across the second reformer 150. Generally, however, the temperature decline across the second reformer 150 is less than the temperature decline across the first reformer 145, because the reactions that occur in the second reformer 150 are generally less endothermic than the reactions that occur in the first reformer 145. Despite the somewhat lower temperature decline across the second reformer 150, the effluent 170 of the second reformer 150 is nevertheless still at a temperature that is less than the desired inlet temperature of the third reformer 175.

The second reformer effluent 170 can pass a second interheater 180 (the first interheater being the previously described interheater 160 between the first and the second reformers 145, 150), and the heated effluent 185 can pass to the third reformer 175.

Likewise, the third reformer effluent 190 can pass to a third interheater 195, and the heated effluent 200 passes to a fourth reformer 205.

The fourth reformer effluent stream 125 is cooled in the combined feed heat exchanger 120 by transferring heat to the combined feed stream 115. After leaving the combined feed heat exchanger 120, the cooled effluent 210 from the fourth reformer 205 passes to a product recovery section (not shown).

Suitable product recovery sections are known to persons of ordinary skill in the art of reforming. Exemplary product recovery facilities generally include gas-liquid separators for separating hydrogen and $C_1$ through $C_3$ hydrocarbon gases from the last reaction zone effluent stream, and fractionation columns for separating at least a portion of the $C_4$ to $C_5$ light hydrocarbons from the remainder of the reformate. In addition, the reformate may be separated by distillation into a light reformate fraction and a heavy reformate fraction.

Figure 2:
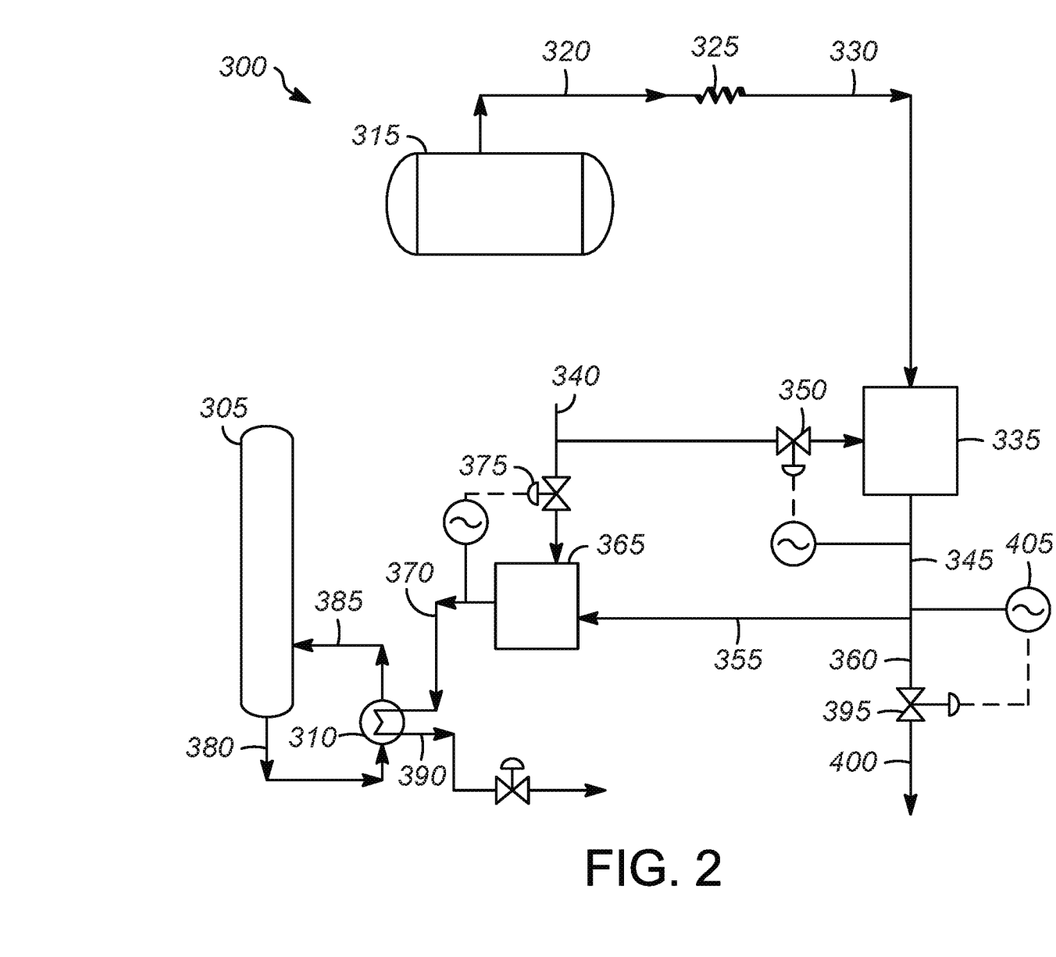
FIG. 2 is an illustration of the current process of providing steam to a steam reboiler for a distillation column.

FIG. 2 illustrates a portion 300 of a typical product recovery section. Distillation column 305 includes a steam reboiler 310. The distillation column 305 could be a depropanizer column, a debutanizer column, a depentanizer column, a dehexanizer column, etc., a stripper columns, a splitter column, and the like, as is known in the art.

The steam for the steam reboiler 310 comes from a steam drum 315. A stream of steam 320 is sent to a superheater 325 to increase the temperature. As an example, the stream of superheated steam 330 might have a temperature in the range of 413° C. to 440° C. (775° F. to 825° F.) and a pressure in the range of 4.6 to 5.2 MPa(g) (660 psig to 750 psig).

The stream of superheated steam 330 is sent to desuperheater 335 where the temperature of the steam is reduced using desuperheating water 340. The temperature of the stream of desuperheated steam 345 is controlled by a temperature control valve 350. The pressure of the stream of desuperheated steam 345 is controlled by a pressure controller 405 with a final element pressure control valve 395. As an example, the stream of desuperheated steam 345 might have a temperature in the range of 385 to 413° C. (725° F. to 775° F.) and a pressure in the range of 4.5 to 5.1 MPa(g) (650 psig to 740 psig).

The stream of desuperheated steam 345 is divided into first and second parts 355, 360. The first part 355 is sent to desuperheater 365 where it is further cooled using desuperheating water 340. The temperature of the desuperheated first part 370 is controlled by a temperature control valve 375 to a suitable temperature for the steam reboiler. As an example, the desuperheated first part 370 might have a temperature in the range of 250 to 300° C., and a pressure in the range of 4.4 to 5 MPa.

The desuperheated first part 370 is sent to the steam reboiler 310 where it exchanges heat with the bottom stream 380. The reheated bottom stream 385 is returned to distillation column 305. The condensate 390 is sent to the condensate header (not shown) for further processing and reuse.

The second part 360 is passed through control valve 395 which reduces the pressure of the steam. The stream of depressurized steam 400 is sent to the steam header (not shown) where it could be sent to other processes and equipment for use. The pressure of the stream of depressurized steam 400 is controlled by other elements in the steam header system (not shown). As an example, the stream of depressurized steam 400 might have a temperature in the range of 385 to 413° C., and a pressure in the range of 1 to 5 MPa, or 4 to 4.3 MPa.

Figure 3:
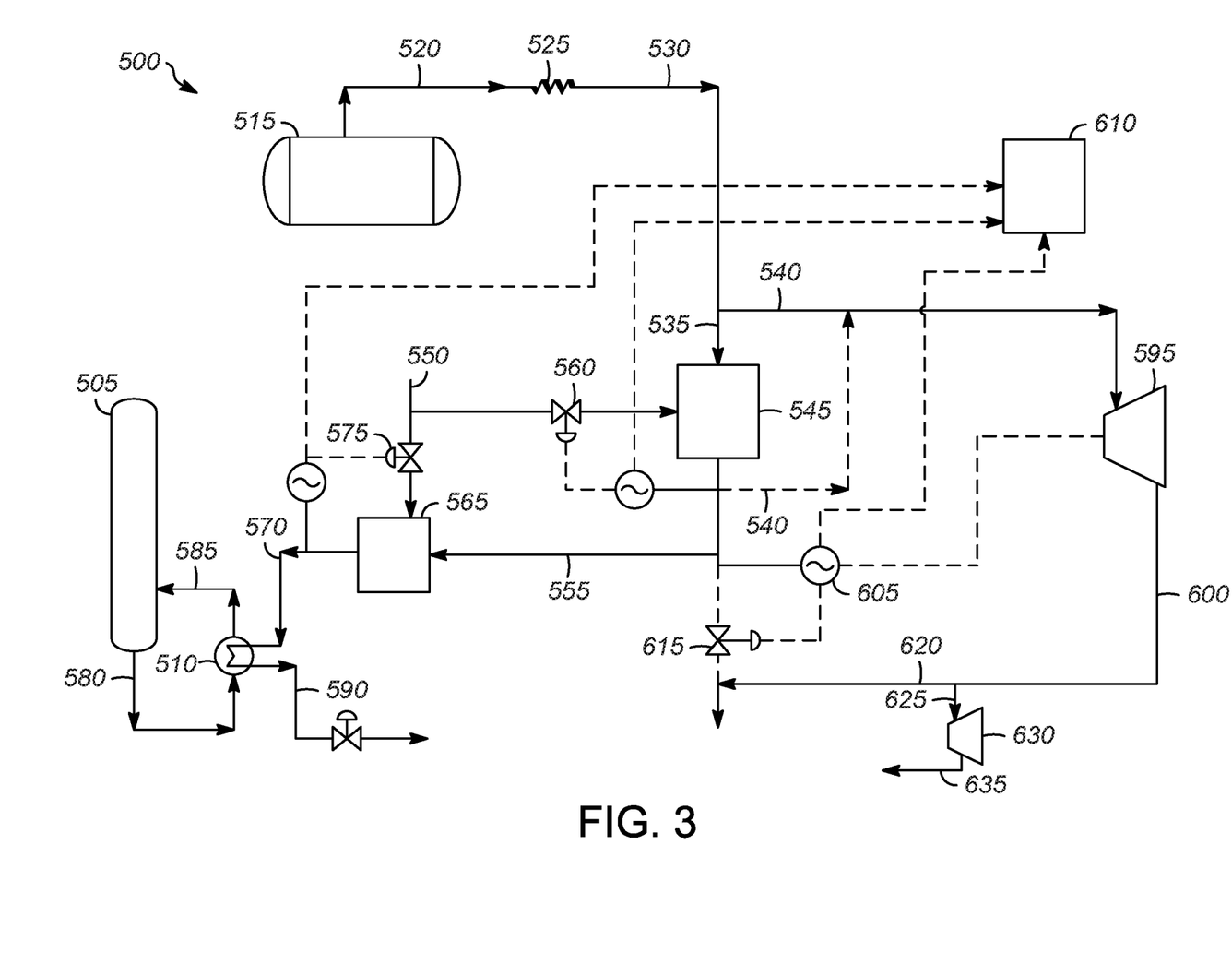
FIG. 3 is an illustration of the process according to the present invention of providing steam to a steam reboiler for a distillation column.

FIG. 3 is an illustration of one embodiment of a portion 500 of a product recovery section according to the present invention. Distillation column 505 includes a steam reboiler 510.

The steam for the steam reboiler 510 comes from a steam drum 515. A stream of steam 520 is sent to a superheater 525 to increase the temperature. As an example, the stream of superheated steam 530 might have a temperature in the range of 413° C. to 440° C. (775° F. to 825° F.) and a pressure in the range of 4.6 to 5.2 MPa(g) (660 psig to 750 psig).

The stream of superheated stream 530 is divided into two portions 535, 540. The stream of superheated stream 530 can be divided before it goes through the desuperheater 545. Alternatively, the stream can be divided after it passes through the desuperheater 545 (shown in dotted lines).

The temperature of the steam in the first portion 535 is reduced in desuperheater 545 using desuperheating water 550. The temperature of the stream of desuperheated steam 555 is controlled by a temperature control valve 560. The pressure of the stream of desuperheated steam 535 is controlled by a pressure controller 605. As an example, the stream of desuperheated steam 555 might have a temperature in the range of 385° C. to 413° C. (725° F. to 775° F.) and a pressure in the range of 4.5 to 5.1 MPa (g) (650 psig to 740 psig).

The stream of desuperheated steam 555 is sent to desuperheater 565 where it is further cooled using desuperheating water 550. The temperature of the desuperheated steam 570 is controlled by a temperature control valve 575 to a suitable temperature for the steam reboiler. As an example, the desuperheated steam 570 might have a temperature in the range of 250 to 300° C., and a pressure in the range of 4.4 to 5 MPa.

The desuperheated steam 570 is sent to the steam reboiler 510 where it exchanges heat with the bottom stream 580. The reheated bottom stream 585 is returned to distillation column 505. The condensate 590 is sent to the condensate header (not shown) for further processing and reuse.

The second portion 540 is directed to power-recovery turbine 595 with associated generator, (not shown) which generates power from the pressure reduction of the steam. The pressure controller 605 controls pressure of stream 555 by adjusting the mass flow of stream 540. The pressure controller may control pressure by controlling the inlet guide vanes (not shown) of the power-recovery turbine or other means. The pressure of the steam exiting the power-recovery turbine 595 could be high pressure steam (but lower than the initial pressure), medium pressure, or low pressure. The stream of depressurized steam 600 is sent to the steam header (not shown) where it could be sent to other processes and equipment for use, such as for example, pumps, compressor, reboiler, stripping or fractionation columns, or other process units, such as risers in fluid catalytic cracking units, and the like.

The pressure of the stream of depressurized steam 600 is controlled by other elements in the steam header system (not shown). As an example, the stream of depressurized steam 600 might have a temperature in the range of 200 to 400° C., and a pressure in the range of 1 to 4.5 MPa or 2 to 2.5 MPa.

The depressurized stream 600 can be divided into first and second parts 620, 625. Second part 625 can be sent to a power-recovery turbine 630 where the pressure is reduced and power is generated. The pressure of stream 635 is less than the pressure of stream 625.

The temperature and pressure control systems include sensing elements, controllers, and final control elements. The sensors can send data to a controller 610, which can transmit signals to the final control elements 560, 575, 615 or the power recovery turbine guide vanes (not shown) to control the process.

In existing systems, control valve 615 can be maintained as a back-up valve, if desired, in the event that the power control turbine 595 is offline (for example, for maintenance). The pressure controller 605 may use control valve 615 instead of or in addition to the inlet guide vanes (not shown) of the power-recovery turbine. Alternatively, a spare turbine could be included.

In some situations, the pressure of the superheated steam 530 can be increased in order to generate more power by gaining higher efficiency in the power-recovery turbine. Even if the efficiency is the same, more power would be generated with increased delta pressure per pound of steam generated.

It should be noted that the temperatures and pressures given are exemplary only and not intended to limit the invention.

The devices and processes of the present invention are contemplated as being utilized in a catalytic reforming reaction zone. As is known, such catalytic reforming reaction zones utilize a process control system, typically on a computer in a control center.

The process control system described in connection with the embodiments disclosed herein may be implemented or performed on the computer with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes associated with the process control system may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor such the processor reads information from, and writes information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like, such as between the input channel, a processor of the control logic, the output channels within the control system and the operator station in the control center.

In communication relative to computers and processors refers to the ability to transmit and receive information or data. The transmission of the data or information can be a wireless transmission (for example by Wi-Fi or Bluetooth) or a wired transmission (for example using an Ethernet RJ45 cable or an USB cable). For a wireless transmission, a wireless transceiver (for example a Wi-Fi transceiver) is in communication with each processor or computer. The transmission can be performed automatically, at the request of the computers, in response to a request from a computer, or in other ways. Data can be pushed, pulled, fetched, etc., in any combination, or transmitted and received in any other manner.

According to the present invention, therefore, it is contemplated that the process control system receives information from the power-recovery turbine 595 relative to an amount of electricity generated by the power-recovery turbine 595. It is contemplated that the power-recovery turbine 595 determines (via the processor) the amount of electricity it has generated. Alternatively, the process control system receiving the information determines the amount of electricity that has been generated by the power-recovery turbine 595. In either configuration, the amount of the electricity generated by the power-recovery turbine 595 is displayed on at least one display screen associated with the computer in the control center. If the catalytic reforming reaction zone comprises a plurality of power-recovery turbine 595, it is further contemplated that the process control system receives information associated with the amount of electricity generated by each of the power-recovery turbine 595. The process control system determines a total electrical power generated based upon the information associated with the each of the power-recovery turbine 595 and displays that the total electrical power generated on the display screen. The total electrical power generated may be displayed instead of, or in conjunction with, the amount of electrical power generated by the individual power-recovery turbine 595.

It is contemplated that the process control system receives information associated with the throughput of the catalytic reforming reaction zone and the column reboiler system, feed quality, product quality, and the like, and determines a target electrical power generated value for the turbine(s) since the electricity represents recoverable excess energy that is typically added to the overall catalytic reforming reaction zone. The determination of the target electrical power generated value may be done when the electricity is at or near a predetermined level. In other words, if the amount of electricity produced meets or exceeds a predetermined level, the process control system can determine one or more processing conditions to adjust and lower the amount of electricity generated until it reaches the target electrical power generated value.

Thus, the process control system will analyze one or more changes to the various processing conditions associated with the catalytic reforming reaction zone or the column reboiler system to lower the amount of energy recovered by the power-recovery turbines of the catalytic reforming reaction zone. Preferably, the processing conditions are adjusted without adjusting the throughput of the catalytic reforming zone. This allows for the catalytic reforming reaction zone to have the same throughput, but with a lower operating cost associated with the same throughput. The process control software may calculate and display the difference between the target electrical power generated value and the total electrical power generated on the display screen.

For example, the process control software may recognize that the total electrical power generated exceeds a predetermined level. Accordingly, the process control software may determine the target electrical power generated value. Based upon other data and information received from other sensors and data collection devices typically associated with the catalytic reforming reaction zone and the column reboiler system, the process control software may determine that the amount of fuel consumed in the heater can be lowered. While maintaining the throughput of the catalytic reforming reaction zone, the amount of fuel consumed in the heater is lowered. While this may lower the electricity generated by the power-recovery turbine, the lower fuel consumption provides a lower operating cost for the same throughput. It may also determine that reduced pressure or flow is optimal for the throughput of the hydrogen compressors. It this way steam or electricity to the compressor driver could be decreased.

Thus, not only does the present invention convert energy that is typically lost into a form that is used elsewhere in the catalytic reforming reaction zone, the catalytic reforming reaction zones are provided with opportunities to lower the energy input associated with the overall catalytic reforming reaction zone and increase profits by utilizing more energy efficient processes.

It should be appreciated and understood by those of ordinary skill in the art that various other components, such as valves, pumps, filters, coolers, etc., are not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Specific Embodiments

While the following is described in conjunction with specific embodiments, it will be understood that this description is intended to illustrate and not limit the scope of the preceding description and the appended claims.

A first embodiment of the invention is a process for recovering electrical power from a process unit waste heat steam generation system comprising providing a stream of superheated steam having a first temperature and a first pressure; dividing the stream of superheated steam into a first portion and a second portion; heating a bottom stream from a column in a steam reboiler with the first portion; introducing the heated bottom stream to the column; and directing the second portion of the superheated steam through a power-recovery turbine to reduce a pressure of the second portion to a second pressure less than the first pressure forming a depressurized stream. An embodiment of the invention is one, any or all of prior embodiments in this paragraph up through the first embodiment in this paragraph further comprising directing the depressurized stream to a steam header. An embodiment of the invention is one, any or all of prior embodiments in this paragraph up through the first embodiment in this paragraph further comprising directing the depressurized stream to at least one of a pump, a compressor, a reboiler, a column, or a process unit. An embodiment of the invention is one, any or all of prior embodiments in this paragraph up through the first embodiment in this paragraph wherein the steam reboiler comprises a heat exchanger having a steam inlet and a condensate outlet, and further comprising directing the condensate to a condensate return header. An embodiment of the invention is one, any or all of prior embodiments in this paragraph up through the first embodiment in this paragraph further comprising reducing a temperature of the first portion of the superheated steam to a second temperature less than the first temperature to form a desuperheated stream before heating the bottom stream. An embodiment of the invention is one, any or all of prior embodiments in this paragraph up through the first embodiment in this paragraph wherein the temperature of the first portion is reduced by introducing the first portion into at least one desuperheater to reduce a temperature of the first portion to a second temperature less than the first temperature to form a desuperheated stream. An embodiment of the invention is one, any or all of prior embodiments in this paragraph up through the first embodiment in this paragraph wherein there are at least two desuperheaters, and wherein a temperature of the desuperheated stream exiting the second desuperheater is less a temperature of the desuperheated stream exiting the first desuperheater. An embodiment of the invention is one, any or all of prior embodiments in this paragraph up through the first embodiment in this paragraph further comprising introducing a stream of desuperheating water into the at least one desuperheater to reduce the temperature of the first portion. An embodiment of the invention is one, any or all of prior embodiments in this paragraph up through the first embodiment in this paragraph further comprising increasing the first pressure of the stream of superheated steam before introducing the first portion into the at least one desuperheater and before directing the second portion through the power-recovery turbine. An embodiment of the invention is one, any or all of prior embodiments in this paragraph up through the first embodiment in this paragraph wherein the stream of superheated steam is divided into the first portion and the second portion before introducing the first portion into the at least one desuperheater. An embodiment of the invention is one, any or all of prior embodiments in this paragraph up through the first embodiment in this paragraph wherein the stream of superheated steam is divided into the first portion and the second portion after introducing the first portion into the at least one desuperheater. An embodiment of the invention is one, any or all of prior embodiments in this paragraph up through the first embodiment in this paragraph further comprising dividing the depressurized stream into a first part and a second part; directing the second part of the depressurized stream through a second power-recovery turbine to reduce a pressure of the second part to a third pressure less than the second pressure. An embodiment of the invention is one, any or all of prior embodiments in this paragraph up through the first embodiment in this paragraph further comprising; selectively directing a part of the desuperheated stream through a pressure control valve. An embodiment of the invention is one, any or all of prior embodiments in this paragraph up through the first embodiment in this paragraph, further comprising at least one of sensing at least one parameter of the process and generating a signal or data from the sensing; or generating and transmitting a signal; or generating and transmitting data.

A second embodiment of the invention is a process for recovering electrical power in a catalytic reforming process comprising reforming a naphtha-containing stream in at least one catalytic reforming zone comprising at least one reformer to form a reformate stream; separating the reformate stream into at least two fractions in a distillation column; heating water or steam using heat from a convection zone of at least one heater to provide a stream of superheated steam having a first temperature and a first pressure; dividing the stream of superheated steam into a first portion and a second portion; introducing the first portion of the superheated steam to at least one desuperheater to reduce a temperature of the first portion to a second temperature less than the first temperature to form a desuperheated stream; heating a bottom stream from the distillation column in a steam reboiler with the desuperheated stream; introducing the heated bottom stream to the distillation column; and directing the second portion of the superheated steam through a power-recovery turbine to reduce a pressure of the second portion to a second pressure less than the first pressure forming a depressurized stream. An embodiment of the invention is one, any or all of prior embodiments in this paragraph up through the second embodiment in this paragraph wherein the steam reboiler comprises a heat exchanger having a steam inlet and a condensate outlet, and wherein a condensate at the condensate outlet has a temperature less than the second temperature, and further comprising directing the condensate to a condensate return header. An embodiment of the invention is one, any or all of prior embodiments in this paragraph up through the second embodiment in this paragraph wherein there are at least two desuperheaters, and wherein a temperature of the desuperheated stream exiting the second desuperheater is less a temperature of the desuperheated stream exiting the first desuperheater. An embodiment of the invention is one, any or all of prior embodiments in this paragraph up through the second embodiment in this paragraph further comprising increasing the first pressure of the stream of superheated steam before introducing the first portion into the at least one desuperheater and before directing the second portion through the power-recovery turbine. An embodiment of the invention is one, any or all of prior embodiments in this paragraph up through the second embodiment in this paragraph wherein the stream of superheated steam is divided into the first portion and the second portion before introducing the first portion into the at least one desuperheater. An embodiment of the invention is one, any or all of prior embodiments in this paragraph up through the second embodiment in this paragraph further comprising dividing the depressurized stream into a first part and a second part; directing the second part of the depressurized stream through a second power-recovery turbine to reduce a pressure of the second part to a third pressure less than the second pressure.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for recovering electrical power from a process unit waste heat steam generation system comprising:
    heating water or steam using heat from a convection zone of at least one heater in a catalytic reforming zone to provide a stream of superheated steam having a first temperature and a first pressure determined by a pressure requirement of a steam reboiler;
    dividing the stream of superheated steam into a first portion and a second portion;
    introducing the first portion into at least one desuperheater, the at least one desuperheater having a steam inlet, a steam outlet, and desuperheater water inlet;
    introducing a stream of desuperheating water into the desuperheater water inlet to reduce a temperature of the first portion to a second temperature less than the first temperature and produce additional steam to form a desuperheated stream, the second temperature being controlled by a temperature controller, and wherein the desuperheated stream has a pressure determined by the pressure requirement of the steam reboiler, the pressure of the desuperheated stream being controlled by a pressure controller;
    introducing the desuperheated stream into the steam reboiler comprising a heat exchanger having a steam inlet and a condensate outlet;
    heating a bottom stream from a column in the steam reboiler with the desuperheated stream forming a heated bottom stream and a condensate, wherein the condensate does not return to the at least one desuperheater;
    introducing the heated bottom stream to the column;
    directing the second portion of the superheated steam through a power-recovery turbine to reduce a pressure of the second portion to a second pressure less than the first pressure and less than the pressure of the desuperheated stream forming a depressurized stream;
    sending the depressurized stream to a steam header system; and
    recovering power from the power-recovery turbine.

2. The process of claim 1 further comprising:
    directing the depressurized stream to at least one of a pump, a compressor, a second reboiler, a second column, or a process unit.

3. The process of claim 1 further comprising:
    directing the condensate to a condensate return header.

4. The process of claim 1 wherein there are at least two desuperheaters, and wherein a temperature of the desuperheated stream exiting a second desuperheater is less than a temperature of the desuperheated stream exiting a first desuperheater.

5. The process of claim 4 wherein the second desuperheater has a steam inlet, a steam outlet, and desuperheater water inlet, and further comprising:
    introducing a stream of desuperheating water into the desuperheater water inlet to reduce the temperature of the desuperheated stream exiting the second desuperheater.

6. The process of claim 1 further comprising:
    increasing the first pressure of the stream of superheated steam before introducing the first portion into the at least one desuperheater and before directing the second portion through the power-recovery turbine.

7. The process of claim 1 wherein the stream of superheated steam is divided into the first portion and the second portion before introducing the first portion into the at least one desuperheater.

8. The process of claim 1 wherein the stream of superheated steam is divided into the first portion and the second portion after introducing the first portion into the at least one desuperheater.

9. The process of claim 1 further comprising:
    dividing the depressurized stream into a first part and a second part;
    directing the second part of the depressurized stream through a second power-recovery turbine to reduce a pressure of the second part to a third pressure less than the second pressure.

10. The process of claim 1 further comprising;
    selectively directing a part of the desuperheated stream through a pressure control valve.

11. The process of claim 1, further comprising at least one of:
    sensing at least one parameter of the process and generating a signal or data from the sensing; or
    generating and transmitting a signal; or
    generating and transmitting data.

12. A process for recovering electrical power in a catalytic reforming process comprising:

reforming a naphtha-containing stream in at least one catalytic reforming zone comprising at least one reformer to form a reformate stream;

separating the reformate stream into at least two fractions in a distillation column;

heating water or steam using heat from a convection zone of at least one heater in the reforming zone to provide a stream of superheated steam having a first temperature and a first pressure determined by a pressure requirement of a steam reboiler;

dividing the stream of superheated steam into a first portion and a second portion;

introducing the first portion of the superheated steam to at least one desuperheater, the at least one desuperheater having a steam inlet, a steam outlet, and desuperheater water inlet;

introducing a stream of desuperheating water into the desuperheater water inlet to reduce a temperature of the first portion to a second temperature less than the first temperature and produce additional steam to form a desuperheated stream, the second temperature being controlled by a temperature controller, and wherein the desuperheated stream has a pressure determined by the pressure requirement of the steam reboiler for a distillation column, the pressure of the desuperheated stream being controlled by a pressure controller;

introducing the desuperheated stream into the steam reboiler comprising a heat exchanger having a steam inlet and a condensate outlet;

heating a bottom stream from the distillation column in the steam reboiler with the desuperheated stream forming a heated bottom stream and a condensate, wherein the condensate does not return to the at least one desuperheater;

introducing the heated bottom stream to the distillation column;

directing the second portion of the superheated steam through a power-recovery turbine to reduce a pressure of the second portion to a second pressure less than the first pressure and less than the pressure of the desuperheated stream forming a depressurized stream;

sending the depressurized stream to a steam header system; and recovering power from the power-recovery turbine.

13. The process of claim 12 wherein the condensate at the condensate outlet has a temperature less than the second temperature, and further comprising:

directing the condensate to a condensate return header.

14. The process of claim 12 wherein there are at least two desuperheaters, and wherein a temperature of the desuperheated stream exiting a a second desuperheater is less than a temperature of the desuperheated stream exiting a first desuperheater.

15. The process of claim 14 wherein the second desuperheater has a steam inlet, a steam outlet, and desuperheater water inlet, and further comprising:

introducing a stream of desuperheating water into the desuperheater water inlet to reduce the temperature of the desuperheated stream exiting the second desuperheater.

16. The process of claim 12 further comprising:

increasing the first pressure of the stream of superheated steam before introducing the first portion into the at least one desuperheater and before directing the second portion through the power-recovery turbine.

17. The process of claim 12 wherein the stream of superheated steam is divided into the first portion and the second portion before introducing the first portion into the at least one desuperheater.

18. The process of claim 12 further comprising:

dividing the depressurized stream into a first part and a second part;

directing the second part of the depressurized stream through a second power-recovery turbine to reduce a pressure of the second part to a third pressure less than the second pressure.

* * * * *